May 27, 1941. T. W. AIKEN 2,243,368
ELECTRODE HANDLE FOR WELDING
Filed Jan. 15, 1940 2 Sheets-Sheet 1
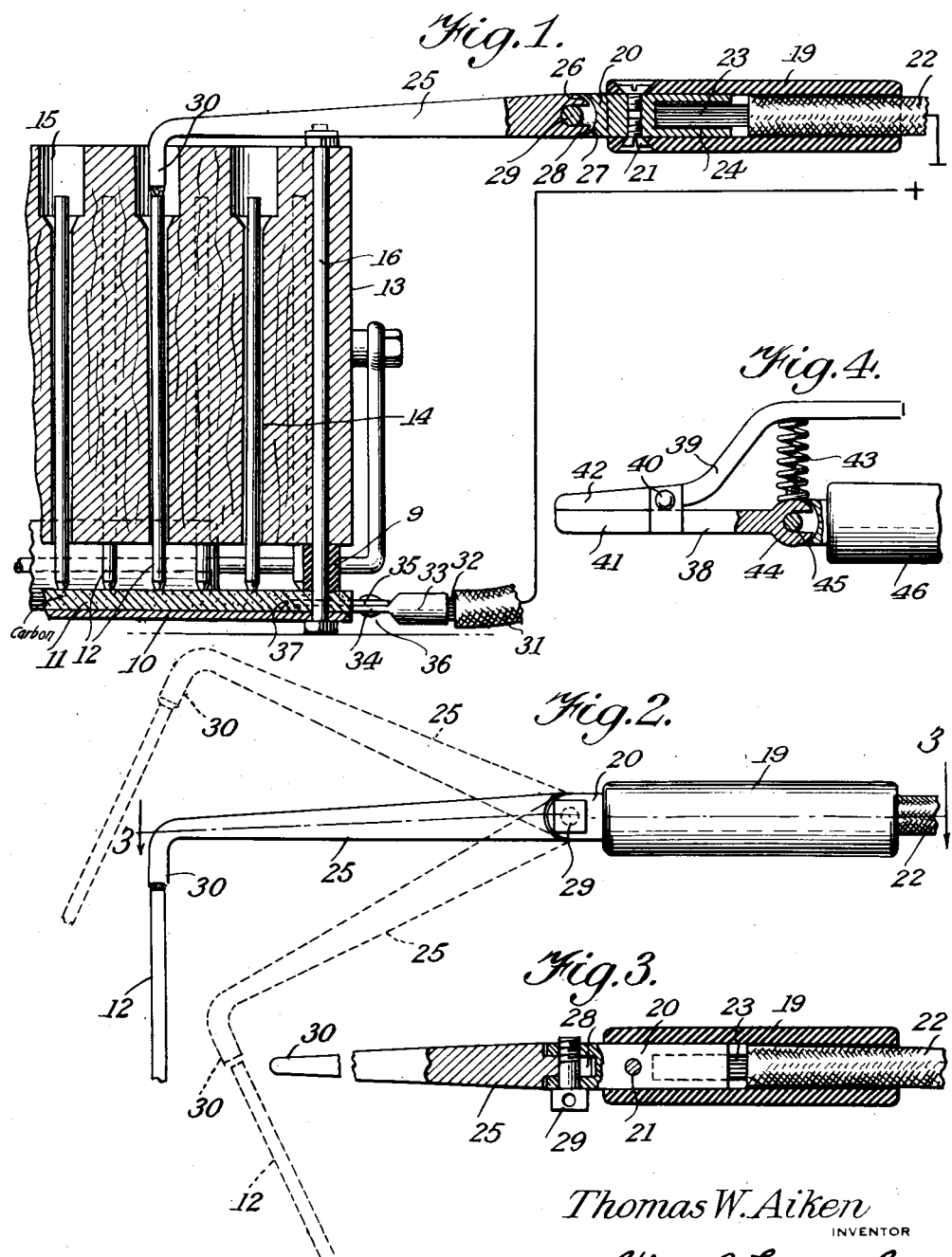
Thomas W. Aiken
INVENTOR
BY Victor J. Evans & Co.
ATTORNEYS May 27, 1941.  T. W. AIKEN  2,243,368
ELECTRODE HANDLE FOR WELDING
Filed Jan. 15, 1940  2 Sheets-Sheet 2
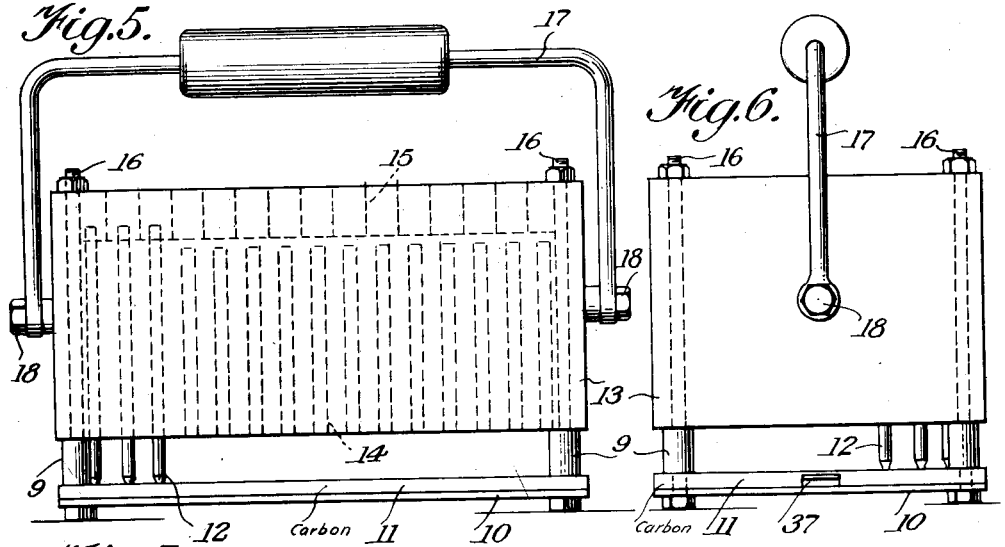
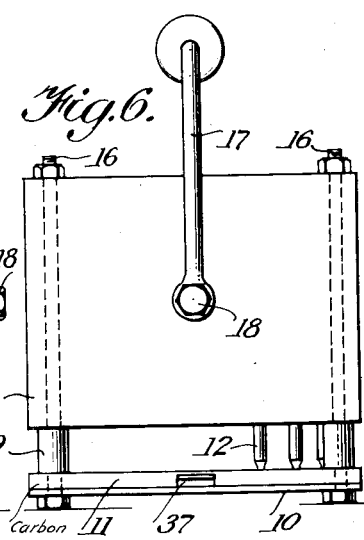
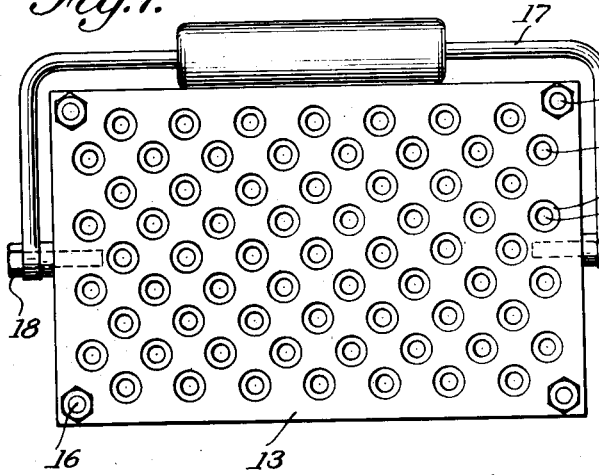
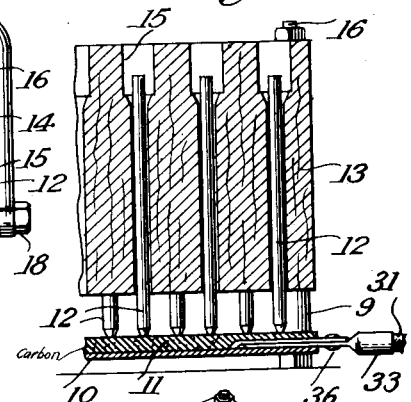
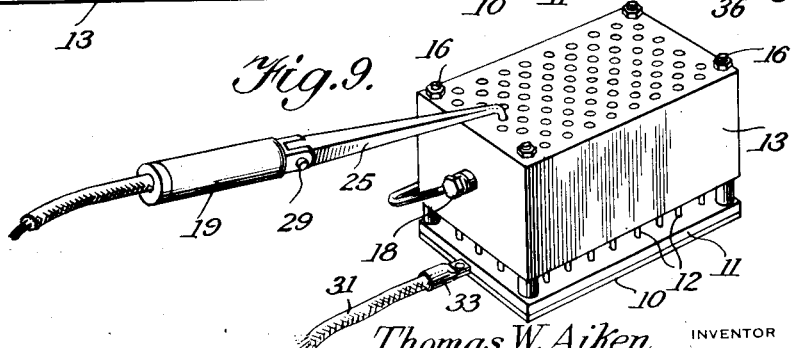
Thomas W. Aiken INVENTOR
BY Victor J. Evans & Co.
ATTORNEYS Patented May 27, 1941

2,243,368

UNITED STATES PATENT OFFICE 2,243,368

ELECTRODE HANDLE FOR WELDING

Thomas W. Aiken, Glassport, Pa., assignor of twenty per cent to William E. Trover, Elizabeth, Pa.

Application January 15, 1940, Serial No. 314,005

1 Claim. (Cl. 219—8)

This invention relates to an electrode magazine and handle for welding and has for an object to provide a magazine for storing a quantity of welding rods vertically, the welding rods forming electrodes connected to one of the circuit wires, the welding handle forming an electrode connected to the other circuit wire, and being adapted to be welded to the upper end of a welding rod in the magazine to remove the rod from the magazine and hold it in place on the work during the welding operation.

A further object is to provide a magazine having counterbores at the upper ends of the welding rod receiving openings to shield the operator's eyes from light and from molten metal while the handle is being welded to the exposed upper end of a welding rod.

A further object is to provide an electrode handle having a joint which may be adjusted to dispose the welding arm of the handle at any comfortable position to the operator.

A further object is to provide apparatus of this character which will be formed of a few strong simple and durable parts, which will be inexpensive to manufacture, and which will not easily get out of order.

With the above and other objects in view the invention consists of certain novel details of construction and combinations of parts hereinafter fully described and claimed, it being understood that various modifications may be resorted to within the scope of the appended claim without departing from the spirit or sacrificing any of the advantages of the invention.

In the accompanying drawings forming part of this specification:

Figure 1 is a longitudinal sectional view of a portion of an electrode magazine and handle constructed in accordance with the invention, and showing the preliminary step of welding the handle to one of the welding rods.

Figure 2 is a side elevation of the handle showing the same welded to one of the welding rods and showing the pivoted arm dotted in adjusted position.

Figure 3 is a longitudinal sectional view of the handle taken approximately on the line 3—3 of Figure 2.

Figure 4 is a plan view of the tongs for use in connection with the welding of short welding rods.

Figure 5 is a side elevation of the magazine showing the carrying bail thereof.

Figure 6 is an end elevation of the magazine shown in Figure 5.

Figure 7 is a plan view of the magazine with the bail in released position.

Figure 8 is a fragmentary longitudinal sectional view showing the connection of one of the circuit wires with the carbon plate which supports the welding rods in the magazine.

Figure 9 is a perspective view of the magazine and welding handle in position for moving a welding rod from the magazine.

Referring now to the drawings in which like characters of reference designate similar parts in the various views, the magazine comprises a metal bottom plate 10 upon which is superposed a carbon plate 11 upon which the bottom of the welding rods 12 are supported. The body 13 of the magazine is formed of a block of wood or other non-conducting material and is provided with a plurality of vertically extending openings 14 adapted to receive a supply of welding rods 12 and hold the same vertically. The upper ends of the openings 14 are counterbored as shown at 15 to provide a bore of large diameter to receive the end of the welding handle as will be presently described and to also shield the operator's eyes from the light and from spraying of molten metal during the interval that the fusing of the rod to the handle takes place.

The body is bolted to the carbon plate and metal base plate by bolts 16 disposed at the corners of the body. Spacers 9 are disposed on the bolts between the body and the carbon plate 11. A conventional bail 17 is secured at the ends to the magazine by screw bolts 18 for carrying the magazine.

The handle comprises an elongated tubular grip 19 formed of insulating material. A shank 20, preferably formed of brass, is engaged in the tubular grip and is secured to the latter by screws 21 passed through the opposite sides of the grip and threaded into the shank. A circuit wire 22 from the source of electricity is stripped of insulation at the end and the bared wire 23 is soldered in a longitudinal recess 24 formed in the end of the shank within the tubular grip.

The handle also includes a forwardly extending arm 25 which is rounded at the rear end as shown at 26 to be pivotally received in a rounded recess 27 formed in the end of the shank, which latter projects from the grip 19. The arm is provided with a slot 28 through which and the projecting end of the shank an adjusting bolt 29 is passed. The arm may be disposed at any angular inclination to the axis of the grip, as shown by dotted lines in Figure 2, and held in this adjusted position by the adjusting bolt 29.

The free end 30 of the arm is directed downwardly at a right angle to the arm and is of sufficient length to enter the counterbore 15 at the upper end of a welding rod opening in the magazine and contact with the upper end of the rod therein.

The other circuit wire 31 from the source of electricity is bared of insulation at the end and the bared wire 32 is equipped with a sleeve 33 which is provided with an integral finger 34 and a finger 35 riveted, as shown at 36, or otherwise secured to the integral finger. Both fingers are engaged in a recess 37 formed in the bottom of the carbon plate and the lower finger rests upon the metal plate 10.

In operation to remove one of the welding rods 12 the free end 30 of the handle is inserted in the counterbore 15 and brought into contact with the upper end of the welding rod. Since the arm and the rod are in circuit with the circuit wires 22 and 31 current will pass through the arm and through the rod. The arm may now be slightly separated from the rod to permit arcing between the arm and the rod for fusing the metal of both parts whereupon the arm is again brought firmly into contact with the rod to weld the arm to the rod. When the arm is withdrawn the rod will be withdrawn from the magazine, as best shown in Figure 2.

Short pieces of welding rod may be used by substituting for the arm 25 a tongs formed of levers 38 and 39 pivotally connected together, as shown at 40, to provide gripping jaws 41 and 42. The levers are separated opposite the jaws and a helical spring 43 is interposed between them to normally hold the jaws closed. One of the levers is equipped with a slot 44 adapted to receive the adjusting bolt 45 of the handle 46.

In operation it will be observed that each welding rod may be used completely leaving no waste since the rod is welded direct to the end of the arm 25 and thus may be used in its entirely all the way to the arm. After one rod is used the operation of withdrawing another rod from the magazine, as above described, is repeated, this resulting in a great saving of time.

From the above description it is thought that the construction and operation of the invention will be fully understood without further explanation.

What is claimed is:

An electrode handle for welding comprising, an elongated tubular grip formed of insulating material, a metal shank in the grip projecting from one end of the grip, a circuit wire in the grip secured to the other end of the shank, said shank having a rounded recess formed in the exposed end, an arm extending forwardly from the shank rounded at the rear end and received in said rounded recess, said rounded rear end of the arm having a slot formed therein providing a fork at the rounded rear end of the arm, and a pivot bolt passed through the slot and the projecting end of the shank and adapted to be tightened to hold the arm in various adjusted positions in an angular direction above and below an alined position with the tubular grip.

THOMAS W. AIKEN.